UNITED STATES PATENT OFFICE.

ISRAEL ROOS, OF FRANKFORT-ON-THE-MAIN, GERMANY, ASSIGNOR TO THE FARBWERKE, VORMALS MEISTER, LUCIUS & BRÜNING, OF HOCHST-ON-THE-MAIN, GERMANY.

SALICYL PARAPHENETIDIN.

SPECIFICATION forming part of Letters Patent No. 576,379, dated February 2, 1897.

Application filed May 10, 1894. Serial No. 510,788. (Specimens.) Patented in England February 25, 1893, No. 4,191.

*To all whom it may concern:*

Be it known that I, ISRAEL ROOS, a citizen of the Empire of Germany, residing at Frankfort-on-the-Main, in the Empire of Germany, have invented certain new and useful Improvements in the Manufacture of a Condensation Product from Salicylaldehyde and Paraphenetidin or Paraänisidin, (for which Letters Patent were granted to me in England, without my consent, No. 4,191, dated February 25, 1893, to the Society of Chemical Industry in Basle, of Basle, Switzerland,) of which the following is a specification.

Salicylaldehyde and paraphenetidin combine with separation of water, forming a pretty crystallized compound in conformity to the equation

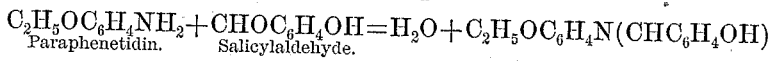

The manufacture of the body in question is carried out substantially as described hereinafter.

Equivalent quantities of paraphenetidin and of salicylaldehyde are dissolved, each for itself, in the double quantity of alcohol and the solutions mixed together. With spontaneous heating the reaction sets in. After cooling the solvent is drawn off from the crystalline mass that has formed and the mass washed with cold alcohol. By recrystallizing from alcohol is obtained the compound in pure state and in the form of light-yellow crystals, melting-point at 94° centigrade. For the alcohol may be substituted ether, benzene, or ligroin.

The condensation product is insoluble in water, difficultly soluble in ligroin, easily soluble in hot alcohol, in ether, and benzene. By diluted hydrochloric acid it is split up at ordinary temperature already with formation of hydrochlorid of paraphenetidin and salicylaldehyde. In diluted soda-lye the substance remains unchanged and is reprecipitated from this solution by acetic acid. When for the paraphenetidin paraänisidin is substituted, the reaction proceeds in exactly the same way.

The product obtained is in form of pale greenish-yellow leaflets, melting-point at 83° centigrade. Its comportment corresponds completely to that of the phenetidin derivative.

My improved compound is intended to be used as a remedy for fever. It is given in single doses of from 0.5 to 1.5 grams or from four to six grams per day for adults and in correspondingly smaller quantities for children.

What I claim as my invention is—

1. The process herein described of producing the orthoöxybenzyliden-alkyl derivatives of amidophenol, which consists in condensing salicylaldehyde with an alkyl derivative of amidophenol, substantially as described.

2. As a new article of manufacture, the orthoöxybenzyliden-alkyl derivative of amidophenol, being insoluble in water, easily soluble in alcohol, ether and benzene, and having the formula

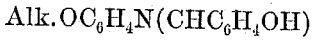

substantially as described.

In testimony that I claim the foregoing as my invention I have signed my name in presence of two subscribing witnesses.

ISRAEL ROOS.

Witnesses:
JEAN GRUND,
FRANK H. MASON.